(12) United States Patent
Kim

(10) Patent No.: US 11,064,402 B2
(45) Date of Patent: Jul. 13, 2021

(54) METHOD AND APPARATUS FOR RELEASING A MOBILITY CONFIGURATION WITHOUT A SIGNAL FROM A NETWORK IN A WIRELESS COMMUNICATION SYSTEM

(71) Applicant: LG ELECTRONICS INC., Seoul (KR)

(72) Inventor: Sangwon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/719,885

(22) Filed: Dec. 18, 2019

(65) Prior Publication Data
US 2020/0196205 A1     Jun. 18, 2020

(30) Foreign Application Priority Data

Dec. 18, 2018  (KR) .................. KR10-2018-0164519

(51) Int. Cl.
*H04W 36/00* (2009.01)
(52) U.S. Cl.
CPC ... *H04W 36/0058* (2018.08); *H04W 36/0033* (2013.01); *H04W 36/0079* (2018.08); *H04W 36/0085* (2018.08); *H04W 36/00837* (2018.08)
(58) Field of Classification Search
CPC . H04W 36/36; H04W 36/0061; H04W 36/04; H04W 36/08; H04W 36/30; H04W 76/27; H04W 16/32; H04W 36/0058; H04W 36/0033; H04W 36/0079; H04W 36/0085; H04W 36/00837
See application file for complete search history.

(56) References Cited

U.S. PATENT DOCUMENTS

| 2019/0174571 A1* | 6/2019 | Deenoo ................. H04W 76/11 |
| 2019/0223073 A1* | 7/2019 | Chen ..................... H04W 76/18 |
| 2019/0380081 A1* | 12/2019 | Chang ................... H04W 36/08 |

OTHER PUBLICATIONS

3rd Generation Partnership Project (3GPP), "Technical Specification Group Radio Access Network; Evolved Universal Terrestrial Radio Access (E-UTRA); Radio Resource Control (RRC); Protocol Specification (Release 15)," 3GPP TS 36.331 V15.1.0, Mar. 2018, 786 pages.
3rd Generation Partnership Project (3GPP), "Technical Specification Group Radio Access Network; NR; Radio Resource Control (RRC) protocol specification (Release 15)," 3GPP TS 38.331 V15.3.0, Sep. 2018, 445 pages.

* cited by examiner

*Primary Examiner* — Nam T Huynh
(74) *Attorney, Agent, or Firm* — Lee Hong Degerman Kang Waimey

(57) ABSTRACT

A method and apparatus for releasing a mobility configuration without a signal from a network in a wireless communication system is provided. A wireless device receives, from a serving cell, a mobility configuration related to a target cell, wherein the mobility configuration includes a specific identity. A wireless device detects that measurement result of the target cell satisfies a leaving condition related to the specific identity. A wireless device releases, autonomously, the mobility configuration related to the target cell based on the detection.

7 Claims, 12 Drawing Sheets

METHOD AND APPARATUS FOR RELEASING A MOBILITY CONFIGURATION WITHOUT A SIGNAL FROM A NETWORK IN A WIRELESS COMMUNICATION SYSTEM

CROSS-REFERENCE TO RELATED APPLICATIONS

Pursuant to 35 U.S.C. § 119 (a), this application claims the benefit of Korean Patent Application No. 10-2018-0164519, filed on Dec. 18, 2018, the contents of which are all hereby incorporated by reference herein in their entirety.

BACKGROUND

Technical Field

The present disclosure relates to a method and apparatus for releasing a mobility configuration without a signal from a network in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In 5th generation (5G) communication system, it is being discussed to introduce conditional mobility. One example of conditional mobility is conditional handover. The conditional handover is essentially a network-configured but user equipment (UE)-controlled downlink mobility mechanism with a potential to reduce the interruption time and handover failure/radio link failure. The conditional handover improves the handover robustness significantly.

SUMMARY

Since, conditional handover configuration could be configured by multiple cells, the signaling overhead for mobility of a wireless device will be increased significantly in the conditional handover. Therefore, studies to reduce the signaling overhead for conditional handover are needed.

In an aspect, a method performed by a wireless device in a wireless communication system is provided. The method includes receiving, from a serving cell, a mobility configuration related to a target cell, wherein the mobility configuration includes a specific identity. The method includes detecting that measurement result of the target cell satisfies a leaving condition related to the specific identity. The method includes releasing, autonomously, the mobility configuration related to the target cell based on the detection.

In another aspect, a wireless device in a wireless communication system is provided. The wireless device includes a memory, a transceiver, and a processor, operably coupled to the memory and the transceiver. The processor of the wireless device is configured to control the transceiver to receive, from a serving cell, a mobility configuration related to a target cell, wherein the mobility configuration includes a specific identity. The processor of the wireless device is configured to detect measurement result of the target cell satisfies a leaving condition related to the specific identity. The processor of the wireless device is configured to release, autonomously, the mobility configuration related to the target cell based on the detection.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
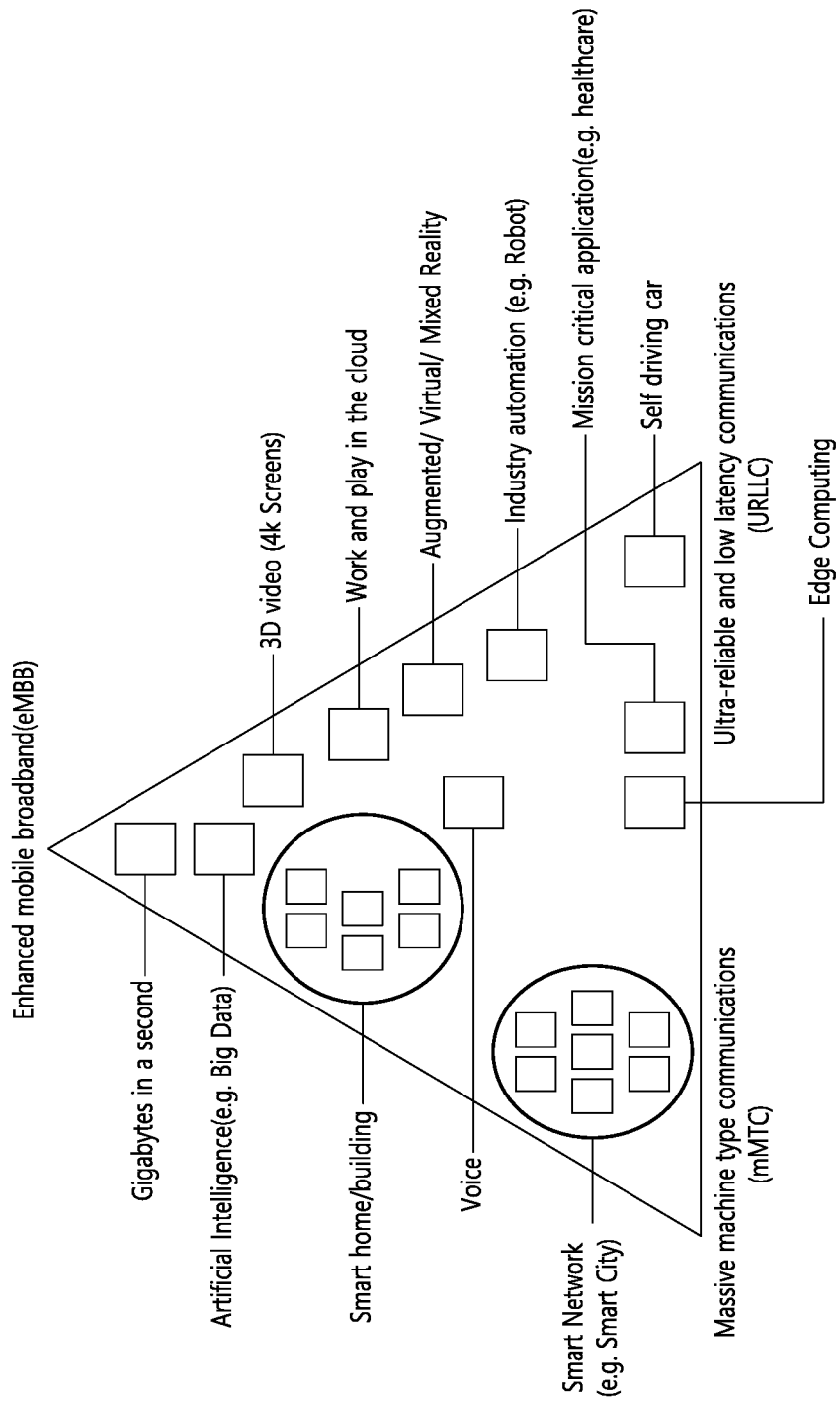
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
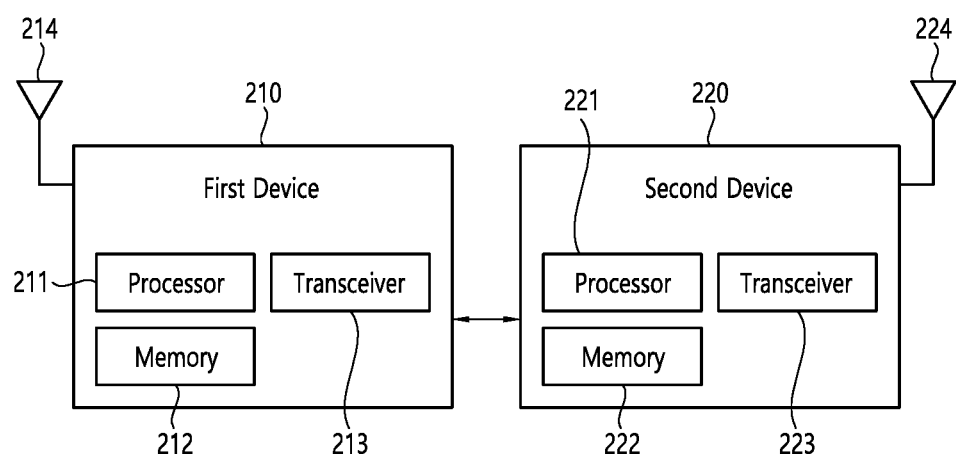
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
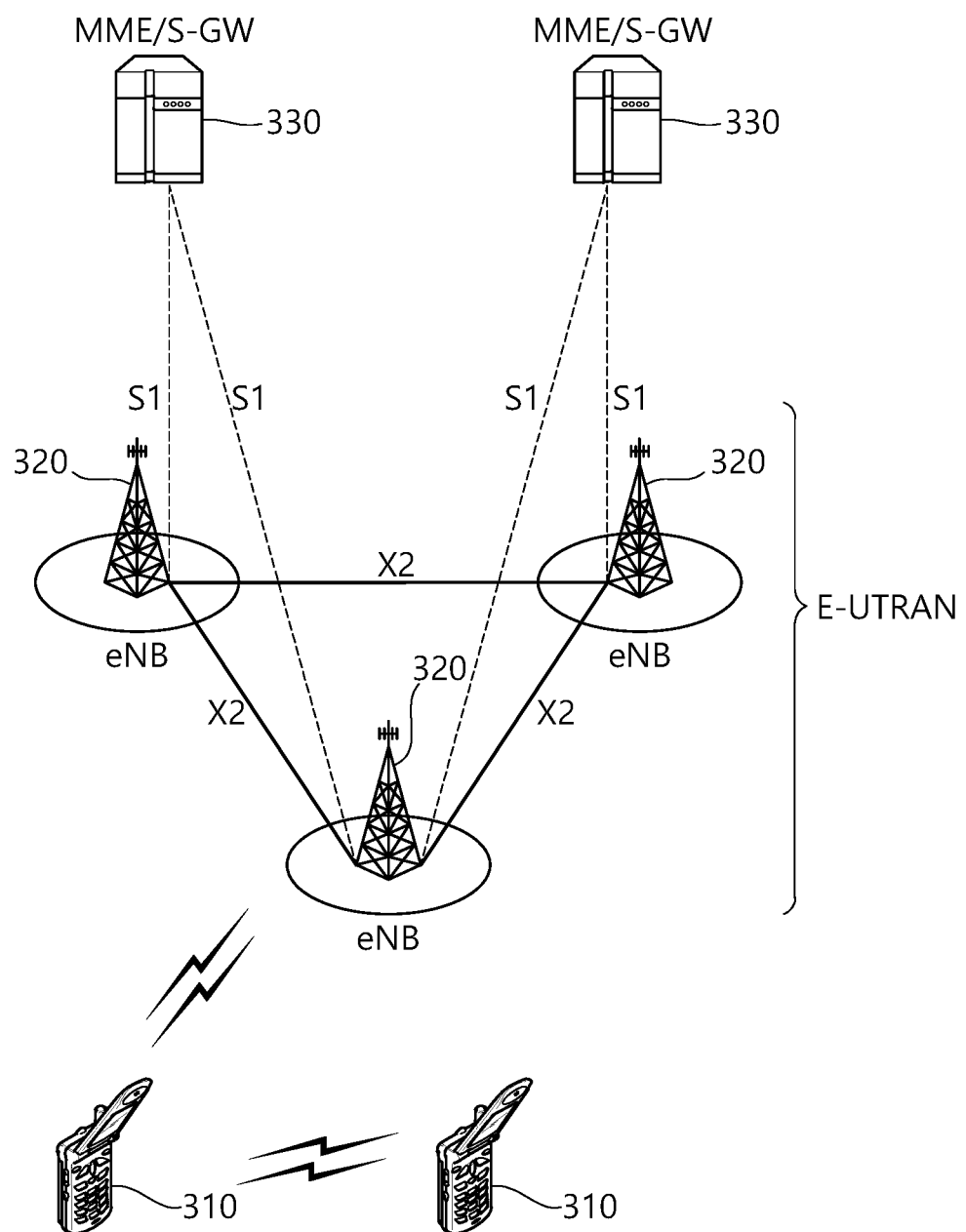
FIG. 3 shows another example of a wireless communication system to which the technical features of the present disclosure can be applied.

FIG. 3 shows another example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
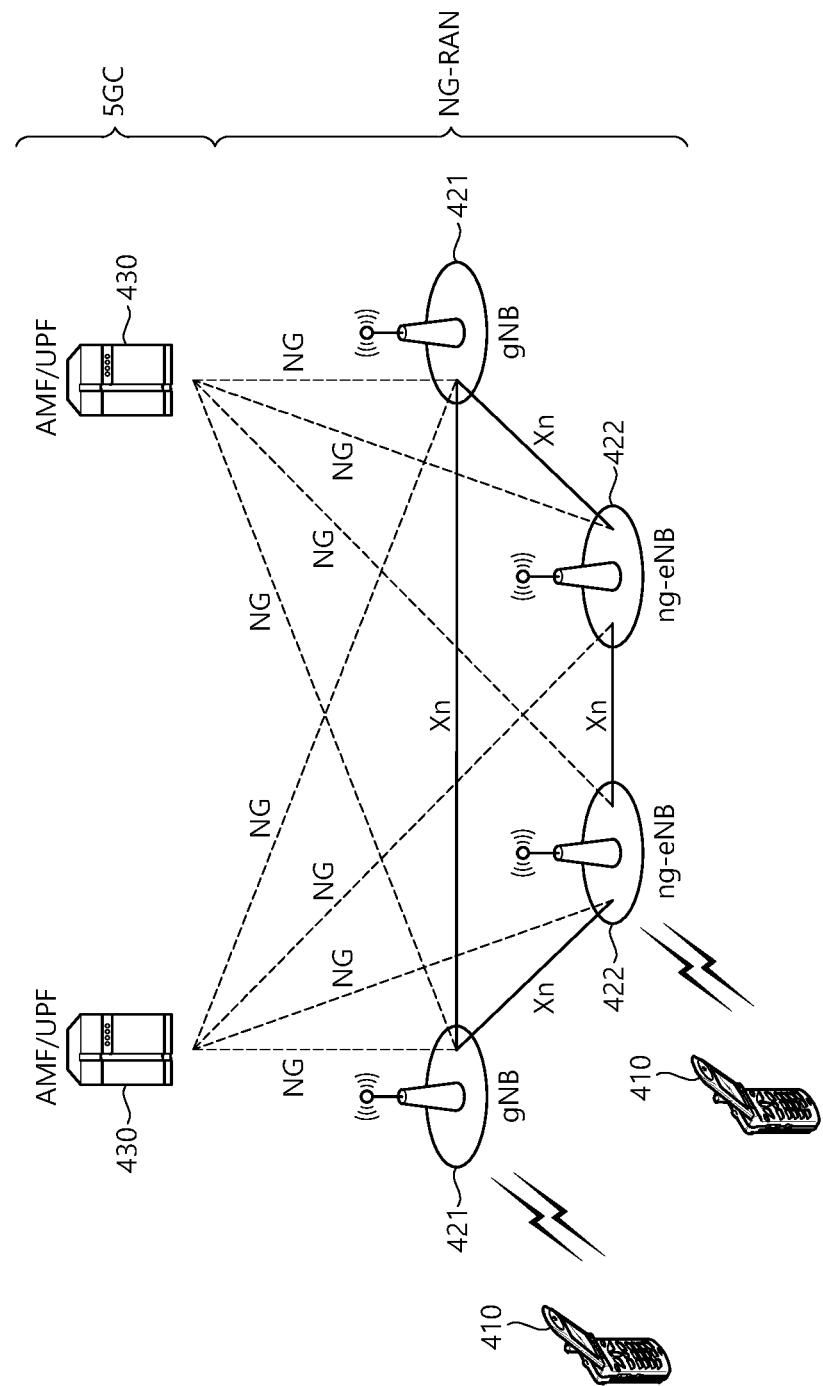
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
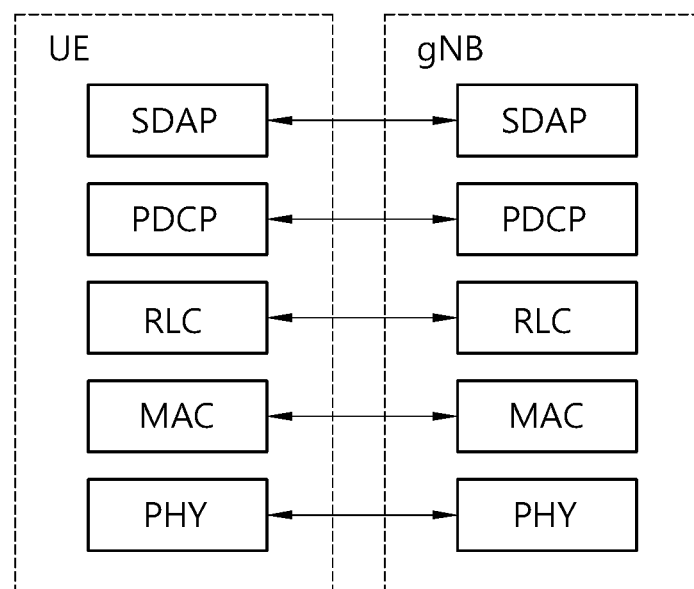
FIG. 5 shows a block diagram of a user plane protocol stack to which the technical features of the present disclosure can be applied.
Figure 6:
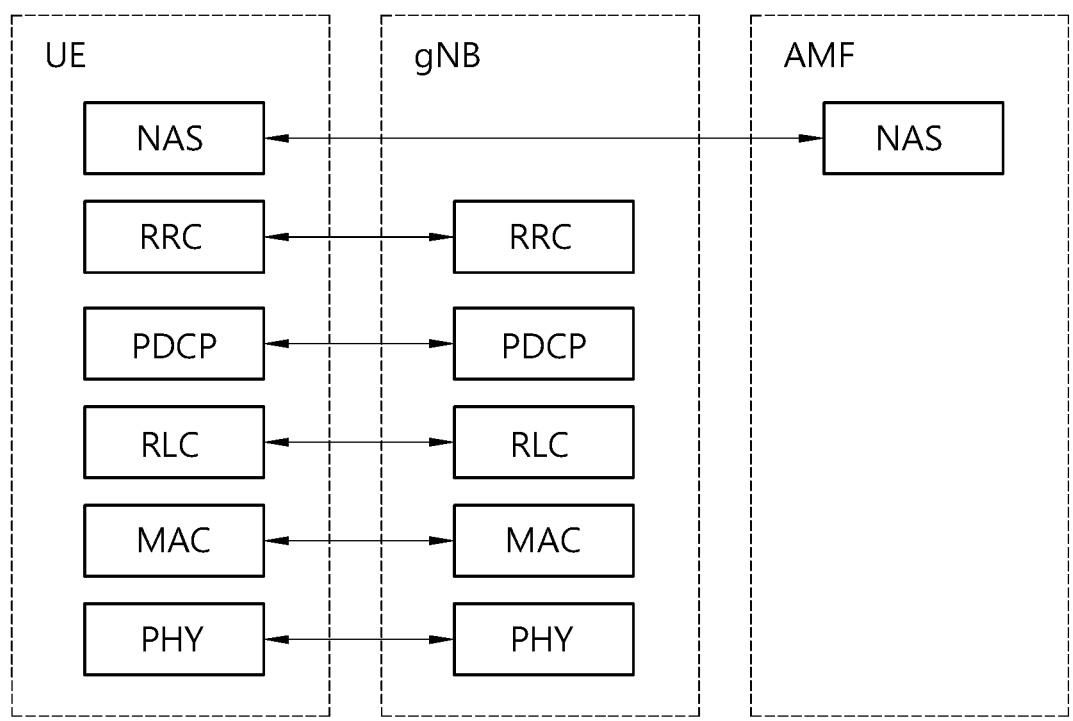
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH.

In UL, CCCH can be mapped to UL-SCH, DCCH can be mapped to UL-SCH, and DTCH can be mapped to UL-SCH.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

UE actions in a handover procedure is described. In the handover procedure, RRC reconfiguration procedure may be performed. It may be referred to as Section 5.3.5 of 3GPP TS 36.331 V15.1.0 (2018-03).

The purpose of this procedure is to modify an RRC connection, e.g. to establish/modify/release RBs, to perform reconfiguration with sync, to setup/modify/release measurements, to add/modify/release SCells and cell groups. As part of the procedure, NAS dedicated information may be transferred from the Network to the UE.

In EN-DC, SRB3 can be used for measurement configuration and reporting, to (re-)configure MAC, RLC, physical layer and RLF timers and constants of the SCG configuration, and to reconfigure PDCP for DRBs associated with the S-$K_{gNB}$ or SRB3, provided that the (re-)configuration does not require any MeNB involvement.

The Network may initiate the RRC reconfiguration procedure to a UE in RRC_CONNECTED. The Network applies the procedure as follows:

the establishment of RBs (other than SRB1, that is established during RRC connection establishment) is performed only when AS security has been activated;

the addition of Secondary Cell Group and SCells is performed only when AS security has been activated;

the reconfigurationWithSync is included in secondary-CellGroup only when at least one DRB is setup in SCG.

Reception of an RRCReconfiguration by the UE will be described. It may be referred to as Section 5.3.5.3 of 3GPP TS 36.331 V15.1.0 (2018-03).

The UE shall perform the following actions upon reception of the RRCReconfiguration:

1> if the RRCReconfiguration includes the fullConfig:
2> perform the radio configuration procedure;
1> if the RRCReconfiguration includes the masterCellGroup:
2> perform the cell group configuration for the received masterCellGroup;
1> if the RRCReconfiguration includes the masterKeyUpdate:
2> perform security key update procedure;
1> if the RRCReconfiguration includes the secondaryCellGroup:
2> perform the cell group configuration for the SCG;
1> if the RRCReconfiguration message contains the radioBearerConfig:
2> perform the radio bearer configuration;
1> if the RRCReconfiguration message includes the measConfig:
2> perform the measurement configuration procedure;
1> if the RRCReconfiguration message includes the dedicatedSIB1-Delivery:
2> perform the action upon reception of SIB1;
1> if the RRCReconfiguration message includes the dedicatedSystemInformationDelivery:
2> perform the action upon reception of System Information;
1> set the content of RRCReconfigurationComplete message as follows:
2> if the RRCReconfiguration includes the masterCellGroup containing the report UplinkTxDirectCurrent, or;
2> if the RRCReconfiguration includes the secondaryCellGroup containing the report UplinkTxDirectCurrent:
3> include the uplinkTxDirectCurrentList;
1> if the UE is configured with E-UTRA nr-SecondaryCellGroupConfig (MCG is E-UTRA):
2> if RRCReconfiguration was received via SRB1:
3> submit the RRCReconfigurationComplete via the EUTRA MCG embedded in E-UTRA RRC message RRCConnectionReconfigurationComplete;
3> if reconfigurationWithSync was included in spCellConfig of an SCG:
4> initiate the random access procedure on the SpCell;
3> else:
4> the procedure ends;

The order the UE sends the RRCConnectionReconfigurationComplete message and performs the Random Access procedure towards the SCG is left to UE implementation.

2> else (RRCReconfiguration was received via SRB3):
3> submit the RRCReconfigurationComplete message via SRB3 to lower layers for transmission using the new configuration;

For EN-DC, in the case of SRB1, the random access is triggered by RRC layer itself as there is not necessarily other UL transmission. In the case of SRB3, the random access is triggered by the MAC layer due to arrival of RRCReconfigurationComplete.

1> else:
2> submit the RRCReconfigurationComplete message via SRB1 to lower layers for transmission using the new configuration;
1> if reconfigurationWithSync was included in spCellConfig of an MCG or SCG, and when MAC of an NR cell group successfully completes a random access procedure triggered above;
2> stop timer T304 for that cell group;
2> apply the parts of the CQI reporting configuration, the scheduling request configuration and the sounding RS configuration that do not require the UE to know the SFN of the respective target SpCell, if any;
2> apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;
2> if the reconfigurationWithSync was included in spCellConfig of an MCG:
3> if the active downlink BWP, which is indicated by the firstActiveDownlinkBWP-Id for the target SpCell of the MCG, has a common search space configured:
4> acquire the SIB1 of the target SpCell of the MCG; 2> the procedure ends.

The UE is only required to acquire broadcasted SIB1 if the UE can acquire it without disrupting unicast data reception, i.e. the broadcast and unicast beams are quasi co-located.

Cell Group configuration will be described. It may be referred to as Section 5.3.5.5 of 3GPP TS 38.331 V15.3.0 (2018-09).

The network configures the UE with Master Cell Group (MCG), and zero or one Secondary Cell Group (SCG). The network provides the configuration parameters for a cell group in the CellGroupConfig IE.

The UE performs the following actions based on a received CellGroupConfig IE:

1> if the CellGroupConfig contains the spCellConfig with reconfigurationWithSync:
2> perform Reconfiguration with sync;
2> resume all suspended radio bearers and resume SCG transmission for all radio bearers, if suspended;
1> if the CellGroupConfig contains the rlc-BearerToReleaseList:
2> perform RLC bearer release;
1> if the CellGroupConfig contains the rlc-BearerToAddModList:
2> perform the RLC bearer addition/modification;
1> if the CellGroupConfig contains the mac-CellGroupConfig:
2> configure the MAC entity of this cell group;
1> if the CellGroupConfig contains the sCellToReleaseList:
2> perform SCell release;
1> if the CellGroupConfig contains the spCellConfig:
2> configure the SpCell;
1> if the CellGroupConfig contains the sCellToAddModList:
2> perform SCell addition/modification.

Reconfiguration with sync by a wireless device will be described.

The UE shall perform the following actions to execute a reconfiguration with sync.

1> stop timer T310 for the corresponding SpCell, if running;
1> start timer T304 for the corresponding SpCell with the timer value set to t304, as included in the reconfigurationWithSync;
1> if the frequencyInfoDL is included:
2> consider the target SpCell to be one on the SSB frequency indicated by the frequencyInfoDL with a physical cell identity indicated by the physCellId;
1> else:
2> consider the target SpCell to be one on the SSB frequency of the source SpCell with a physical cell identity indicated by the physCellId;
1> start synchronising to the DL of the target SpCell and acquire the MIB of the target SpCell;

The UE should perform the reconfiguration with sync as soon as possible following the reception of the RRC message triggering the reconfiguration with sync, which could be before confirming successful reception (HARQ and ARQ) of this message.

1> reset the MAC entity of this cell group;
1> consider the SCell(s) of this cell group, if configured, to be in deactivated state;
1> apply the value of the newUE-Identity as the C-RNTI for this cell group; Verify that this does not configure some common parameters which are later discarded due to e.g. SCell release or due to LCH release.
1> configure lower layers in accordance with the received spCellConfigCommon;
1> configure lower layers in accordance with any additional fields, not covered in the previous, if included in the received reconfigurationWithSync.

SPCell Configuration will be described.
The UE shall:
1> if the SpCellConfig contains the rlf-TimersAndConstants:
2> configure the RLF timers and constants for this cell group
1> else if rlf-TimersAndConstants is not configured for this cell group:
2> use values for timers T301, T310, T311 and constants N310, N311, as included in ue-TimersAndConstants received in SIB1;
1> if the SpCellConfig contains spCellConfigDedicated:
2> configure the SpCell in accordance with the spCellConfigDedicated;
2> consider the bandwidth part indicated in firstActiveUplinkBWP-Id if configured to be the active uplink bandwidth part;
2> consider the bandwidth part indicated in firstActiveDownlinkBWP-Id if configured to be the active downlink bandwidth part;
2> if the any of the reference signal(s) that are used for radio link monitoring are reconfigured by the received spCellConfigDedicated:
3> stop timer T310 for the corresponding SpCell, if running;
3> reset the counters N310 and N311.

SCell Release will be described.
The UE shall:
1> if the release is triggered by reception of the sCellToReleaseList:
2> for each sCellIndex value included in the sCellToReleaseList:
3> if the current UE configuration includes a SCell with value sCellIndex:
4> release the SCell.

SCell Addition and/or Modification will be described.
The UE shall:
1> for each sCellIndex value included in the sCellToAddModList that is not part of the current UE configuration (SCell addition):
2> add the SCell, corresponding to the sCellIndex, in accordance with the sCellConfigCommon and sCellConfigDedicated;
2> configure lower layers to consider the SCell to be in deactivated state;
FFS Check automatic measurement handling for SCells.
2> for each measId included in the measIdList within VarMeasConfig:
3> if SCells are not applicable for the associated measurement; and
3> if the concerned SCell is included in cellsTriggeredList defined within the VarMeasReportList for this measId:
4> remove the concerned SCell from cellsTriggeredList defined within the VarMeasReportList for this measId;
1> for each sCellIndex value included in the sCellToAddModList that is part of the current UE configuration (SCell modification):
2> modify the SCell configuration in accordance with the sCellConfigDedicated.

Hereinafter, events for measurement report triggering will be described. It may be referred to as Section 5.5.4 of 3GPP TS 36.331 V15.1.0 (2018-03).

Event A1 (Serving becomes better than threshold) will be described.
The UE shall:
1> consider the entering condition for this event to be satisfied when condition A1-1, as specified below, is fulfilled;
1> consider the leaving condition for this event to be satisfied when condition A1-2, as specified below, is fulfilled;
1> for this measurement, consider the primary or secondary cell that is configured on the frequency indicated in the associated measObjectEUTRA to be the serving cell;

Inequality A1-1 (Entering condition)

$$Ms-Hys>Thresh$$

Inequality A1-2 (Leaving condition)

$$Ms+Hys<Thresh$$

The variables in the formula are defined as follows:
Ms is the measurement result of the serving cell, not taking into account any offsets.
Hys is the hysteresis parameter for this event (i.e. hysteresis as defined within reportConfigEUTRA for this event).
Thresh is the threshold parameter for this event (i.e. a1-Threshold as defined within reportConfigEUTRA for this event).
Ms is expressed in dBm in case of RSRP, or in dB in case of RSRQ and RS-SINR.
Hys is expressed in dB.
Thresh is expressed in the same unit as Ms.

Event A2 (Serving becomes worse than threshold) will be described.
The UE shall:
1> consider the entering condition for this event to be satisfied when condition A2-1, as specified below, is fulfilled;
1> consider the leaving condition for this event to be satisfied when condition A2-2, as specified below, is fulfilled; 1> for this measurement, consider the primary or secondary cell that is configured on the frequency indicated in the associated measObjectEUTRA to be the serving cell;

Inequality A2-1 (Entering condition)

$$Ms+Hys<Thresh$$

Inequality A2-2 (Leaving condition)

$$Ms-Hys>Thresh$$

The variables in the formula are defined as follows:

Ms is the measurement result of the serving cell, not taking into account any offsets.

Hys is the hysteresis parameter for this event (i.e. hysteresis as defined within reportConfigEUTRA for this event).

Thresh is the threshold parameter for this event (i.e. a2-Threshold as defined within reportConfigEUTRA for this event).

Ms is expressed in dBm in case of RSRP, or in dB in case of RSRQ and RS-SINR.

Hys is expressed in dB.

Thresh is expressed in the same unit as Ms.

Event A4 (Neighbour becomes better than threshold) will be described.

The UE shall:

1> consider the entering condition for this event to be satisfied when condition A4-1, as specified below, is fulfilled;

1> consider the leaving condition for this event to be satisfied when condition A4-2, as specified below, is fulfilled;

Inequality A4-1 (Entering condition)

$$Mn+Ofn+Ocn-Hys>Thresh$$

Inequality A4-2 (Leaving condition)

$$Mn+Ofn+Ocn+Hys<Thresh$$

The variables in the formula are defined as follows:

Mn is the measurement result of the neighbouring cell, not taking into account any offsets.

Ofn is the frequency specific offset of the frequency of the neighbour cell (i.e. offsetFreq as defined within measObjectEUTRA corresponding to the frequency of the neighbour cell).

Ocn is the cell specific offset of the neighbour cell (i.e. cellIndividualOffset as defined within measObjectEUTRA corresponding to the frequency of the neighbour cell), and set to zero if not configured for the neighbour cell.

Hys is the hysteresis parameter for this event (i.e. hysteresis as defined within reportConfigEUTRA for this event).

Thresh is the threshold parameter for this event (i.e. a4-Threshold as defined within reportConfigEUTRA for this event).

Mn is expressed in dBm in case of RSRP, or in dB in case of RSRQ and RS-SINR.

Ofn, Ocn, Hys are expressed in dB.

Thresh is expressed in the same unit as Mn.

As described above, some example events for measurement report triggering are disclosed on the present disclosure. However, the present disclosure is not limited thereto. For example, other events on the Section 5.5.4 of 3GPP TS 36.331 V15.1.0 (2018-03) could be applied to the present disclosure.

Hereinafter a conditional handover will be described.

To avoid sending of the RRC messages when the radio conditions are bad, it would be beneficial to send the RRC message containing the Handover Command to the UE earlier when the radio conditions are better. The likelihood of successful transfer of the message is then much higher. The RRC message may include conditions for when the UE should execute the handover and when the conditions are fulfilled the UE executes the handover in accordance with the Handover Command.

What type of conditions that should be possible to configure can be further studied, but examples of such conditions can e.g. be that the UE detects out-of-synch for a configurable amount of time after sending the Measurement Report or that the quality of the target cell becomes X dB stronger than the serving cell. The threshold used in a preceding measurement reporting event should be chosen lower than the one in the handover execution condition. This allows the serving cell to prepare the handover upon reception of an early measurement report and provide the RRC-ConnectionReconfiguration at a time when the radio link to the UE is still stable. The execution of the handover is done at a later point in time (and threshold) which is considered optimal for the handover execution.

Figure 7:
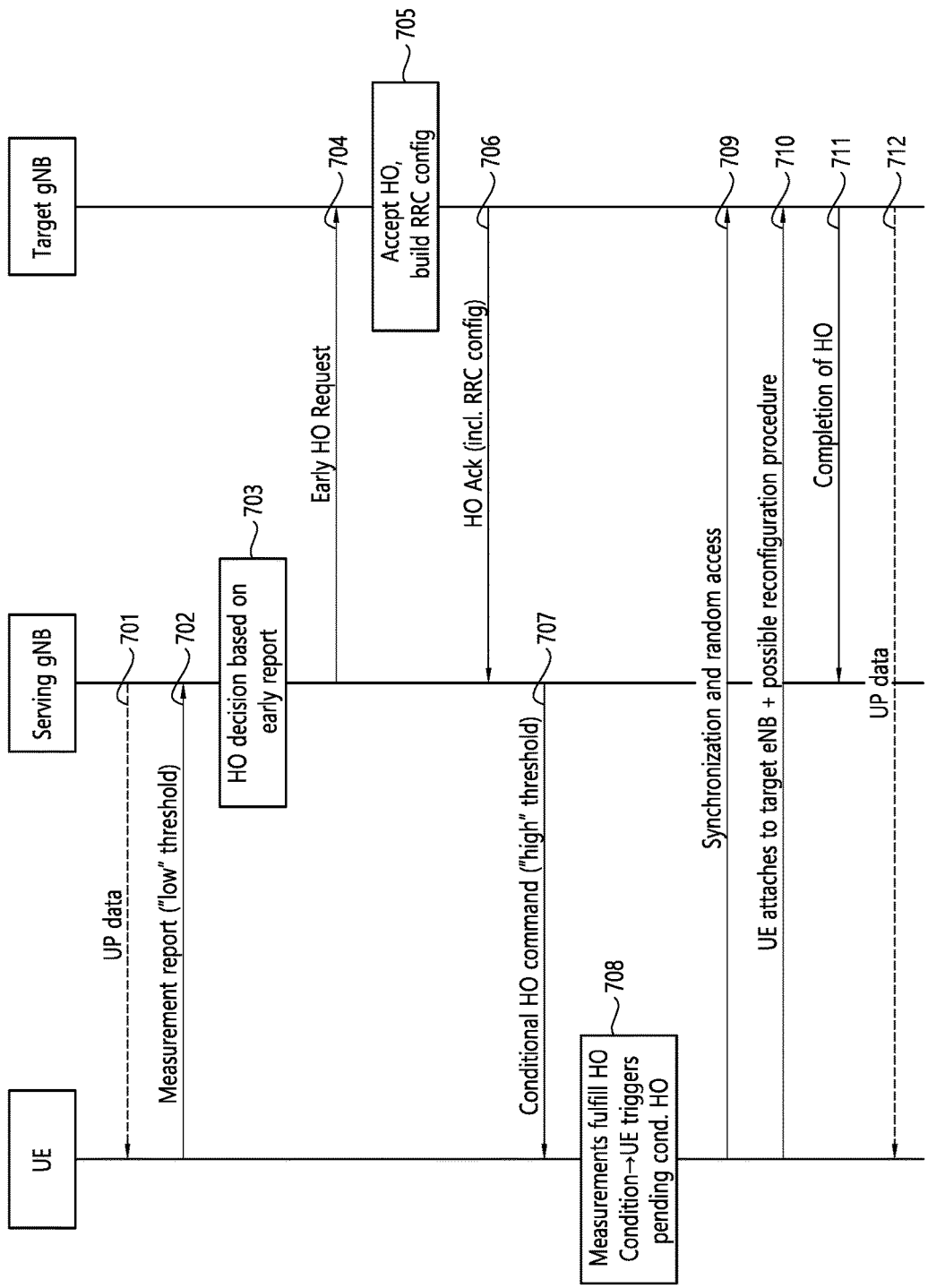
FIG. 7 shows an example of a conditional handover procedure to which the technical features of the present disclosure can be applied.

FIG. 7 shows an example of a conditional handover procedure to which the technical features of the present disclosure can be applied. In FIG. 7, there are only one serving cell and one target cell in a wireless communication system. However, the present disclosure is not limited thereto. For example, there may be one or more target cells which are reported as possible candidates for handover by the UE. In this case, radio access network (RAN) may have possibility to configure plurality of conditional handover commands for several cells and the configuration of the conditions may be different for different cells.

Referring to FIG. 7, in step 701, a UE may receive user plane (UP) data from a serving gNB.

In step 702, a UE may transmit a measurement report to a serving gNB. The measurement report may indicate that the measurement result of the serving gNB is lower than a "low" threshold.

In step 703, a serving gNB may make a handover (HO) decision based on early report.

In step 704, a target gNB may receive, from a serving gNB, early HO request.

In step 705, a target gNB may accept HO request and build RRC configuration.

In step 706, a target gNB may transmit HO acknowledgement (ACK) to a serving gNB. The HO ACK may include RRC configuration.

In step 707, a serving cell may transmit conditional HO command to a UE. The conditional HO commend may include a "high" threshold.

In step 708, a UE may detect that measurements fulfill a HO condition. The UE may trigger corresponding conditional HO.

In step 709, a UE may perform a synchronization and random access with a target gNB.

In step 710, a UE may attach to target gNB and perform reconfiguration procedure.

In step 711, a target gNB may transmit an indication of a completion of HO to a serving cell.

In step 712, a UE may receive UP data from a target gNB.

Meanwhile, when a wireless device performs a common handover in a wireless communication system, only one command (e.g. handover command or SCell change command) is needed to be signaled for the single mobility.

However, since conditional mobility configuration has been used, the signaling overhead for a mobility of a wireless device may be significantly increased. For example, for a single handover, the conditional handover configurations could be configured by one or more of candidate cells. In addition, when one of conditional handover commands is no longer valid, additional configuration should be signaled to release the invalid configuration. Therefore, studies to reduce the signaling overhead for conditional handover are needed.

Hereinafter, a method and apparatus for releasing a mobility configuration without a signal from a network in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 8:
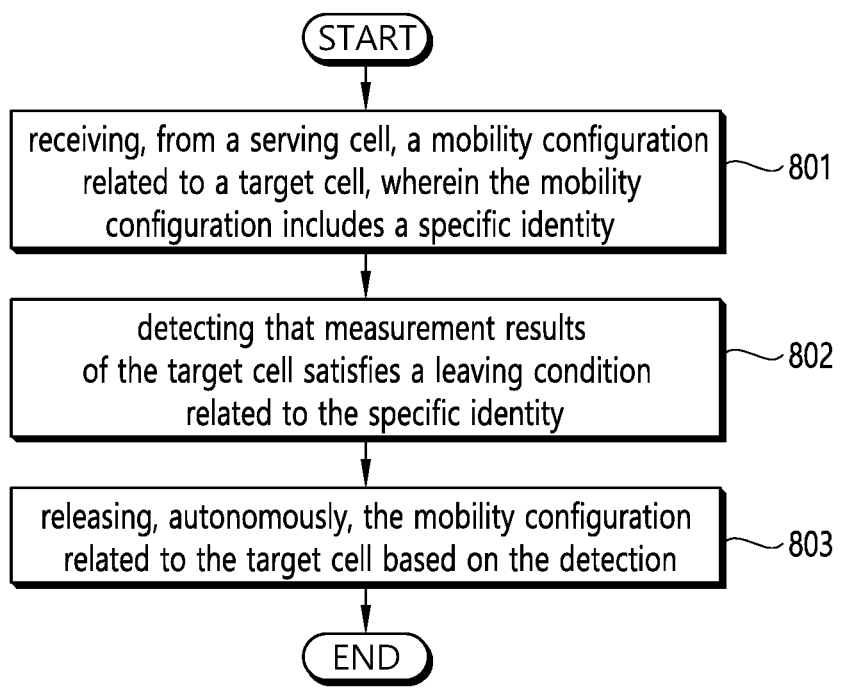
FIG. 8 shows an example of a method for releasing a mobility configuration without a signal from a network in a wireless communication system, according to some embodiments of the present disclosure.

FIG. 8 shows an example of a method for releasing a mobility configuration without a signal from a network in a wireless communication system, according to some embodiments of the present disclosure.

According to some embodiment of the present disclosure, a wireless device may receive a measurement configuration from a network (i.e. a serving cell). The measurement configuration may include a list of report configurations and a list of measurement objects. The report configurations may include one or more of conditions (for example, entering or leaving condition of event A1, entering or leaving condition of event A2, etc.) for triggering measurement report, respectively. The measurement object may include one or more of cells or group of cells, respectively. For example, a wireless device may trigger measurement report, when measurement results of a target cell satisfies a condition included in a report configuration.

In step 801, a wireless device may receive, from a serving cell, a mobility configuration related to a target cell, wherein the mobility configuration includes a specific identity.

According to some embodiments of the present disclosure, the specific identity may be a measurement identity. The measurement identity may be configured for the wireless device for measurement purpose. The measurement identity may be related to a measurement object and a measurement configuration. For example, the measurement identity may be related to a target cell and a leaving condition.

According to some embodiments of the present disclosure, the specific identity may be a report configuration identity. The report configuration identity may be configured for the wireless device for measurement purpose. The report configuration may indicate a report configuration including a leaving condition.

According to some embodiments of the present disclosure, a wireless device may transmit, to a network (for example, a serving cell), a measurement report including an information related to the specific identity, before receiving the mobility configuration. For example, the measurement report may include a measurement identity. For other example, the measurement report may include an information related to the report configuration identity.

The network may determine whether to configure a mobility configuration for a target cell or not based on the measurement report.

The network may determine to configure the mobility configuration and transmit the mobility configuration to the wireless device in response to the measurement report. The wireless device may receive the mobility configuration in response to the measurement report. The wireless device may recognize that the mobility configuration is transmitted in response to the measurement report, since the mobility configuration includes the information related to the specific identity.

According to some embodiments of the present disclosure, a mobility configuration may include a conditional handover command.

According to some embodiments of the present disclosure, the mobility configuration may include a network configuration related to mobility of the wireless device. For example, the mobility configuration may include at least one of condition for change of a primary cell (PCell), condition for addition of a secondary cell (SCell), condition for change of the SCell, condition for release of the SCell, condition for addition of a primary SCell (PSCell), condition for change of the PSCell, and/or condition for release of the PSCell.

In step 802, a wireless device may detect that measurement result of the target cell satisfies a leaving condition related to the specific identity. For example, the leaving condition may be configured by the serving cell via a measurement configuration. The leaving condition may be related to a report configuration included in the measurement configuration. For example, the leaving condition may be configured for each of the target cell and the measurement identity. For example, the leaving condition may be configured by the serving cell, via the mobility configuration.

In step 803, a wireless device may release, autonomously, the mobility configuration related to the target cell based on the detection.

According to some embodiments of the present disclosure, a wireless device may transmit, to the serving cell, a measurement report related to the target cell based on the detection, wherein the measurement report includes an information related to the specific identity. For example, the measurement report may include a measurement identity. For other example, the measurement report may include an information related to a report configuration including the leaving condition, such as a report configuration identity. The network may recognize that the mobility configuration is released based on the received measurement report. Therefore, the network may not transmit other signal to the wireless device for releasing the mobility configuration.

According to some embodiments of the present disclosure, the measurement report may include an additional information, such as a new indication informing the serving cell that the mobility configuration is released autonomously. In this case, the network may recognize that the mobility configuration is released based on the received information.

According to some embodiments of the present disclosure, a wireless device may start a timer based on the detection in step 802. The wireless device may release the mobility configuration when the timer is expired. The wireless device may transmit a measurement report when the timer is expired. The timer may be configured by the serving cell.

For example, when a wireless device detects that measurement result of the target cell satisfies a leaving condition related to the specific identity, the wireless device may start a timer. If the timer is expired, the wireless device may release the mobility configuration and transmit the measurement report, so that the network may recognize that the mobility configuration is released.

In this case, in step 803, for report configuration identity indicated in the mobility configuration, measurement reporting may be triggered by the leaving condition of the report configuration is met for the cell which is indicated as a mobility target cell in the mobility configuration. The wireless device may autonomously release the corresponding mobility configuration, when the leaving condition of the report configuration is met.

According to some embodiments of the present disclosure, the mobility configuration may be related to multiple target cells. In this case the specific identity in the step 801, such as the measurement identity or the report configuration identity, may be configured separately for each of the multiple target cells.

For example, a wireless device may receive a first mobility configuration related to a first target cell. The wireless device may also receive a second mobility configuration related to a second target cell. The first mobility configuration may include a first specific identity and the second mobility configuration may include a second specific identity. The wireless device may detect that measurement result of the first target cell satisfies a first leaving condition related to the first specific identity. In addition, the wireless device may not determine that measurement result of the second target cell does not satisfy a second leaving condition related to the second specific identity. The wireless device may autonomously release the first mobility configuration related to the first target cell. The wireless device may keep the second mobility configuration. The wireless device may transmit, to a network, a first measurement report related to the first target cell. The first measurement report may include an information related to the first specific identity. The network may recognize that the first mobility configuration is released by receiving the first measurement report including the information related to the first specific identity.

According to some embodiments of the present disclosure, the wireless device may be an autonomous driving apparatus in communication with at least one of a mobile terminal, a network, and/or autonomous vehicles other than the wireless device.

According to some embodiments of the present disclosure, a method for releasing a mobility configuration without a signal from a network in a wireless communication system may include the following steps.

In step 0, a wireless device may send a measurement report message to a network. This step would not be performed essentially. However, it is desirable that step 0 is performed by a wireless device, so that the network would be able to properly determine whether to configure the mobility configuration for the wireless device or not.

In step 1, a wireless device may receive a mobility configuration from a network. The mobility configuration may include one of measurement identity. The measurement identity may have been configured for the wireless device for measurement purpose.

In Step 2, for measurement identity indicated in the mobility configuration, when measurement reporting may be triggered (or sent to network) by the leaving condition is met for the cell which is indicated as a mobility target cell in the mobility configuration, a wireless device may autonomously release the corresponding mobility configuration for the cell. In other words, a wireless device may autonomously release a corresponding mobility configuration for a target cell and may trigger a measurement reporting for measurement identity indicated in the mobility configuration, when a leaving condition for the target cell is met.

For example, in step 1, the mobility configuration may include network configuration related to mobility of a wireless device. For example, the network configuration may include conditional handover command (i.e. condition for PCell change). For example, the network configuration may include conditional SCell addition, change, or release (i.e. condition for SCell addition, change, release). For example, the network configuration may include conditional PSCell addition, change, or release (i.e. condition for PSCell addition, change, or release). A network may configure the mobility configuration based on the measurement report received from a wireless device.

For example, in step 1, the mobility configuration may include one of report configuration identity which has been configured for a wireless device for measurement purpose, instead of measurement identity. In this case, in step 2, for report configuration identity indicated in the mobility configuration, measurement reporting may be triggered by the leaving condition of the report configuration is met for the cell, which is indicated as a mobility target cell in the mobility configuration. A wireless device may autonomously release the corresponding mobility configuration.

For example, in step 1, a wireless device may receive the mobility configuration for multiple mobility target cells. In this case, the measurement identity or report configuration identity can be configured separately for each mobility target cell.

For example, in step 2, the mobility target cell may be a target PCell, target PSCell, or target SCell.

For example, in step 2, for the measurement identity indicated in the mobility configuration, even though the 'reportOnLeave is set to false' in the corresponding report configuration, i.e. a wireless device is not configured to initiate the measurement reporting procedure when the leaving condition is met for a cell in cellsTriggeredList, a wireless device may initiate the measurement reporting procedure when the leaving condition is met for a cell which is indicated as a mobility target cell in the mobility configuration.

For example, in step 2, if a network receives the measurement report from the wireless device, the network would be able to know that the mobility condition is released by the wireless device. Desirably, additional indicator can be included in the measurement report to make sure that the mobility configuration is released.

For example, in step 2, a timer can be used to delay the autonomous release of the mobility configuration. A wireless device may start the timer when the measurement reporting is triggered in step 2, and releases the mobility configuration when the timer expires. The timer value can be configured by network.

Figure 9:
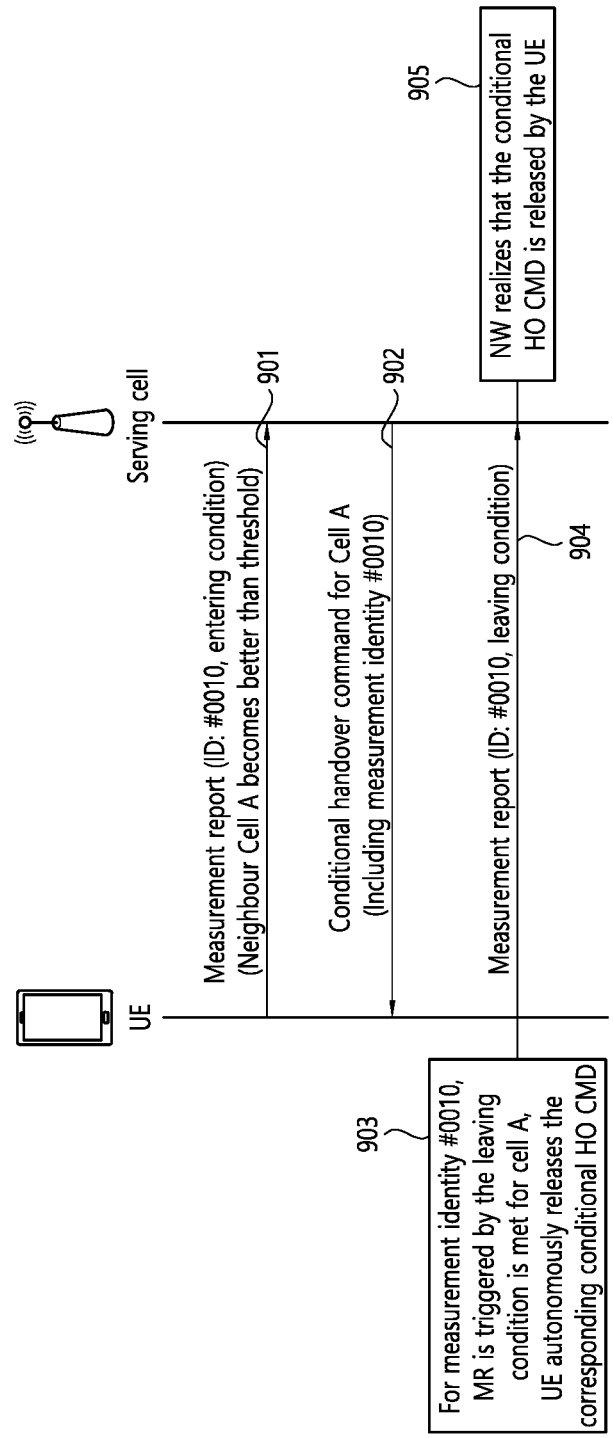
FIG. 9 shows an example of a method for releasing a mobility configuration without a signal from a network in a wireless communication system, according to some embodiments of the present disclosure.

FIG. 9 shows an example of a method for releasing a mobility configuration without a signal from a network in a wireless communication system, according to some embodiments of the present disclosure.

For a wireless device, following measurement may be configured:

Measurement identity: #0010
Report configuration for measurement identity #0010:
  Event A4 (Neighbor becomes better than threshold)
Measurement object configuration for measurement identity #0010: frequency c (Cell A is operated on the frequency c). The cell A may be referred to as a candidate target cell in this example.

Referring to FIG. 9, in step 901, measurement reporting may be triggered by the entering condition is met for the cell A, so the wireless device transmits the measurement results of cell A via the measurement report message to a network (for example, serving cell).

In step 902, the network may determine that the cell A is suitable as a candidate of handover target cell for the wireless device by receiving the measurement report including measurement identity #0010. Therefore, the network may construct and transmit the conditional handover command to the wireless device. The conditional handover command may include measurement identity #0010 and candidate target cell identity, cell A.

In step 903, for measurement identity #0010, the measurement reporting may be triggered by the leaving condition is met for cell A. The wireless device may release the mobility configuration including cell identity A and measurement identity #0010, i.e. conditional handover command for cell A.

In step 904, the wireless device may send the measurement report message including measurement identity #0010 to a network.

In step 905, the network may realize that the cell A becomes worse than threshold by receiving the measurement report including measurement identity #0010. In addition, the network may realize that the wireless device releases the conditional handover command for cell A by receiving the measurement report including measurement identity #0010.

According to some embodiments of the present disclosure, the wireless device could release the mobility configuration autonomously. Thus, the mobility configuration may not be released by network command and the network may not determine whether to release the mobility configuration based on the measurement report received from the wireless device. Therefore, the signalling overhead for mobility could be reduced.

According to some embodiments of the present disclosure, a wireless communication system may save resource for signalling overhead to release a mobility configuration.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Figure 10:
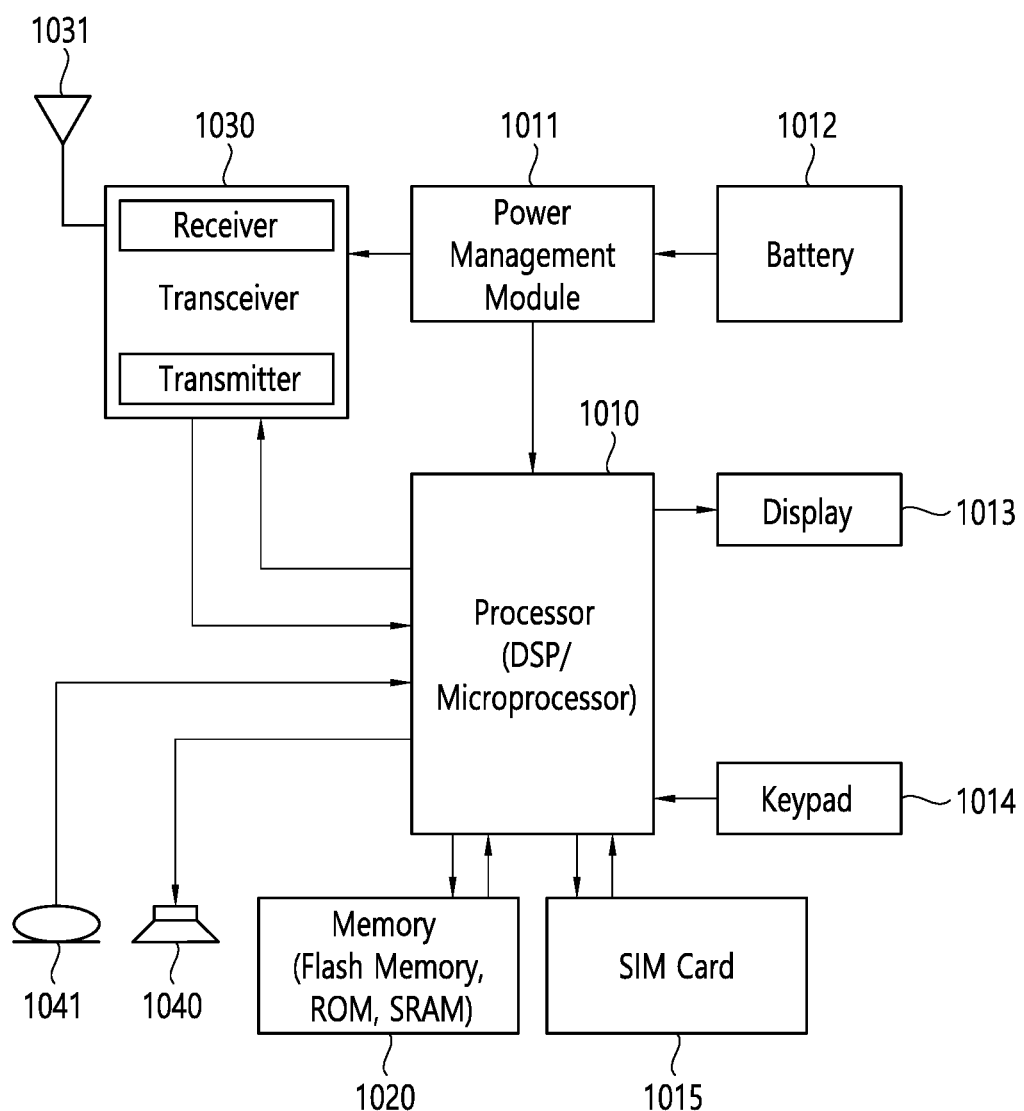
FIG. 10 shows an apparatus to which the technical features of the present disclosure can be applied.

FIG. 10 shows an apparatus to which the technical features of the present disclosure can be applied. The detailed description of the same features as those described above will be simplified or omitted.

An apparatus may be referred to as a wireless device, such as a user equipment (UE), an Integrated Access and Backhaul (IAB), or etc.

A wireless device includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

According to some embodiments of the present disclosure, the processor 1010 may be configured to be coupled operably with the memory 1020 and the transceiver 1030.

The processor 1010 may be configured to control the transceiver 1030 to receive, from a serving cell, a mobility configuration related to a target cell. The mobility configuration may include a specific identity. The processor 1010 may be configured to detect measurement result of the target cell satisfies a leaving condition related to the specific identity. The processor 1010 may be configured to release, autonomously, the mobility configuration related to the target cell based on the detection.

According to some embodiments of the present disclosure, a processor 1010 of a wireless device may release a mobility configuration without a signal from a network. Therefore, a wireless communication system may save resource for signalling overhead to release a mobility configuration.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 11:
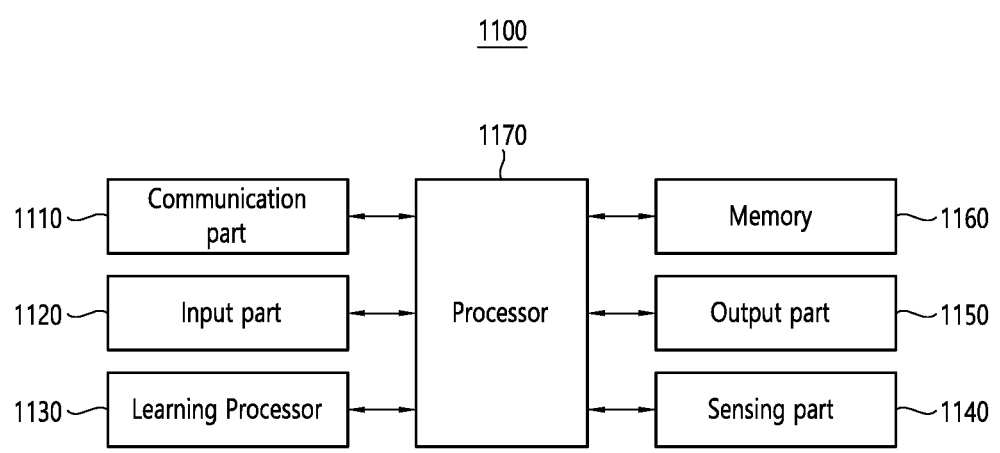
FIG. 11 shows an example of an AI device to which the technical features of the present disclosure can be applied.

FIG. 11 shows an example of an AI device to which the technical features of the present disclosure can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1160, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1160, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc. The output part 1150 may include a display for outputting visual information, a speaker for outputting auditory information, and/or a haptic module for outputting tactile information.

The memory 1160 may store data that supports various functions of the AI device 1100. For example, the memory 1160 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1160, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (SIT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1160 and/or the learning processor 1130, and/or transmit to an external device such as the AI server. The collected history information can be used to update the learning model. The processor 1170 may control at least some of the components of AI device 1100 to drive an application program stored in memory 1160. Furthermore, the processor 1170 may operate two or more of the components included in the AI device 1100 in combination with each other for driving the application program.

Figure 12:
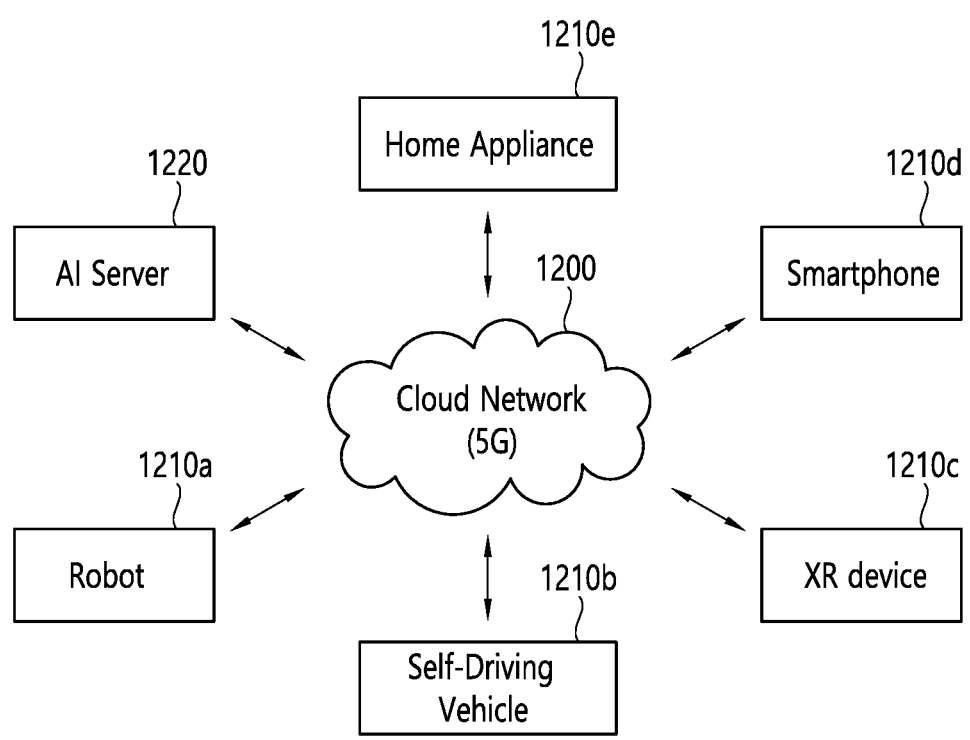
FIG. 12 shows an example of an AI system to which the technical features of the present disclosure can be applied.

FIG. 12 shows an example of an AI system to which the technical features of the present disclosure can be applied.

Referring to FIG. 12, in the AI system, at least one of an AI server 1220, a robot 1210a, an autonomous vehicle 1210b, an XR device 1210c, a smartphone 1210d and/or a home appliance 1210e is connected to a cloud network 1200. The robot 1210a, the autonomous vehicle 1210b, the XR device 1210c, the smartphone 1210d, and/or the home appliance 1210e to which the AI technology is applied may be referred to as AI devices 1210a to 1210e.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210a to 1210e and 1220 consisting the AI system may be connected to each other through the cloud network 1200. In particular, each of the devices 1210a to 1210e and 1220 may communicate with each other through a base station, but may directly communicate with each other without using a base station.

The AI server 1220 may include a server for performing AI processing and a server for performing operations on big data. The AI server 1220 is connected to at least one or more of AI devices constituting the AI system, i.e. the robot 1210a, the autonomous vehicle 1210b, the XR device 1210c, the smartphone 1210d and/or the home appliance 1210e through the cloud network 1200, and may assist at least some AI processing of the connected AI devices 1210a to 1210e. The AI server 1220 can learn the ANN according to the machine learning algorithm on behalf of the AI devices 1210a to 1210e, and can directly store the learning models and/or transmit them to the AI devices 1210a to 1210e. The AI server 1220 may receive the input data from the AI devices 1210a to 1210e, infer the result value with respect to the received input data using the learning model, generate a response and/or a control command based on the inferred result value, and transmit the generated data to the AI devices 1210a to 1210e. Alternatively, the AI devices 1210a to 1210e may directly infer a result value for the input data using a learning model, and generate a response and/or a control command based on the inferred result value.

Various embodiments of the AI devices 1210a to 1210e to which the technical features of the present disclosure can be applied will be described. The AI devices 1210a to 1210e shown in FIG. 12 can be seen as specific embodiments of the AI device 1100 shown in FIG. 11.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication, the method comprising:

receiving, from a serving cell, a measurement configuration including mapping information between a measurement identity and a frequency as a measurement object, wherein the measurement configuration set measurement reporting based on a leaving condition to false;

transmitting, to the serving cell, a first measurement report for a candidate target cell based on that an entering condition for the candidate target cell is met, wherein the first measurement report includes a certain measurement identity informing a certain frequency on which the candidate target cell is operated;

receiving, from the serving cell, a conditional handover command for the candidate target cell in response to the first measurement report, wherein the conditional handover command includes (1) the certain measurement identity, and (2) a cell identity of the candidate target cell;

detecting that the leaving condition for the candidate target cell is met;

releasing, autonomously, the conditional handover command for the candidate target cell based on the detection; and transmitting, to the serving cell, a second measurement report including the certain measurement identity based on the detection, regardless of the measurement configuration, wherein the second measurement report includes an information informing that the conditional handover command for the candidate target cell is released autonomously.

2. The method of claim 1, wherein the leaving condition is configured by the serving cell.

3. The method of claim 1, wherein the conditional handover command for the candidate target cell is related to mobility of the wireless device.

4. The method of claim 1, wherein the method further comprises, starting a timer based on the detection; and releasing the conditional handover command for the candidate target cell based on the timer expiring.

5. The method of claim 4, wherein the timer is configured by the serving cell.

6. The method of claim 1, wherein the wireless device is an autonomous driving apparatus in communication with at least one of a mobile terminal, a network, and/or autonomous vehicles other than the wireless device.

7. A wireless device in a wireless communication system, the wireless device comprising:

a memory;

a transceiver; and a processor, operably coupled to the memory and the transceiver, and configured to:

control the transceiver to receive, from a serving cell, a measurement configuration including mapping information between a measurement identity and a frequency as a measurement object, wherein the measurement configuration set measurement reporting based on a leaving condition to false;

control the transceiver to transmit, to the serving cell, a first measurement report for a candidate target cell based on that an entering condition for the candidate target cell is met, wherein the first measurement report includes a certain measurement identity informing a certain frequency on which the candidate target cell is operated;

control the transceiver to receive, from the serving cell, a conditional handover command for the candidate target cell in response to the first measurement report, wherein the conditional handover command includes (1) the certain measurement identity, and (2) a cell identity of the candidate target cell;

detect that the leaving condition for the candidate target cell is met;

release, autonomously, the conditional handover command for the candidate target cell based on the detection; and control the transceiver to transmit, to the serving cell, a second measurement report including the certain measurement identity based on the detection, regardless of the measurement configuration, wherein the second measurement report includes an information informing that the conditional handover command for the candidate target cell is released autonomously.

\* \* \* \* \*